United States Patent
Bourgeois

[19]

[11] Patent Number: 6,132,612
[45] Date of Patent: Oct. 17, 2000

[54] LIQUID DEIONIZING TWIN BED APPARATUS

[75] Inventor: Edmund Bernard Bourgeois, Shelby Township, Mich.

[73] Assignee: Ebbco, Inc., Chesterfield, Mich.

[21] Appl. No.: 08/935,983

[22] Filed: Sep. 23, 1997

[51] Int. Cl.[7] ............................................. B01D 27/02
[52] U.S. Cl. ................................. 210/282; 210/284
[58] Field of Search .................................. 210/282, 283, 210/284, 290

[56] References Cited

U.S. PATENT DOCUMENTS

| | | | |
|---|---|---|---|
| 2,087,157 | 7/1937 | Lind | 210/282 |
| 2,278,488 | 4/1942 | Ralston | 210/282 |
| 3,136,719 | 6/1964 | Serra | 210/284 |
| 4,228,000 | 10/1980 | Hoeschler | 210/673 |
| 4,329,225 | 5/1982 | Davis et al. | 210/96.1 |
| 4,400,278 | 8/1983 | Martinola | 210/678 |
| 4,645,604 | 2/1987 | Martinola | 210/290 |
| 4,659,476 | 4/1987 | Burriat et al. | 210/675 |
| 5,061,372 | 10/1991 | Rak | 210/673 |
| 5,211,851 | 5/1993 | Meurer | 210/670 |
| 5,234,601 | 8/1993 | Janke et al. | 210/662 |
| 5,250,187 | 10/1993 | Franks | 210/661 |
| 5,271,837 | 12/1993 | Discepolo et al. | 210/282 |
| 5,378,370 | 1/1995 | Brane et al. | 210/678 |

*Primary Examiner*—Ivars Cintins
*Attorney, Agent, or Firm*—Bliss McGlynn, P.C.

[57] ABSTRACT

A liquid deionizing twin bed apparatus of the type used in conjunction with a pressure vessel having an inlet for receiving untreated ionized liquid and an outlet through which the treated deionized liquid exits the vessel. The apparatus is comprised of at least one liquid permeable container having an anionic exchanger bed containing materials adapted to absorb one type of charged particle from the fluid and also having a cationic exchanger bed containing materials to absorb oppositely charged particles from the liquid flowing therethrough. The anionic and cationic beds are positioned in series in the liquid permeable container relative to fluid flow therethrough and the liquid permeable container is adapted to be removably housed within the vessel for removing spent anionic and cationic materials and replacing spent anionic and cationic materials by inserting a new liquid permeable container having unspent anionic and cationic materials into the vessel.

19 Claims, 3 Drawing Sheets

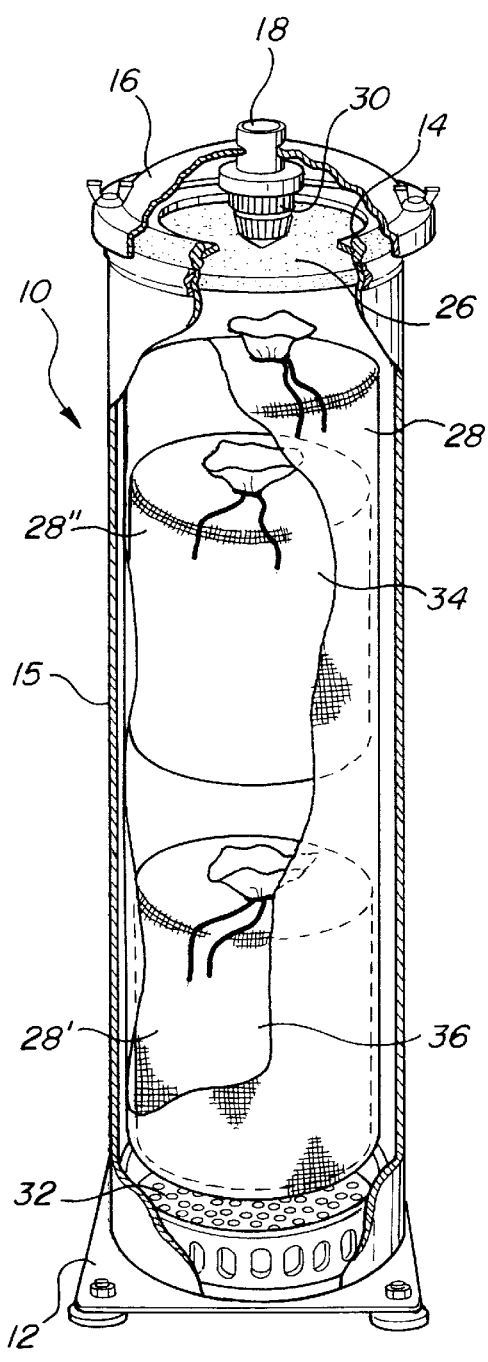
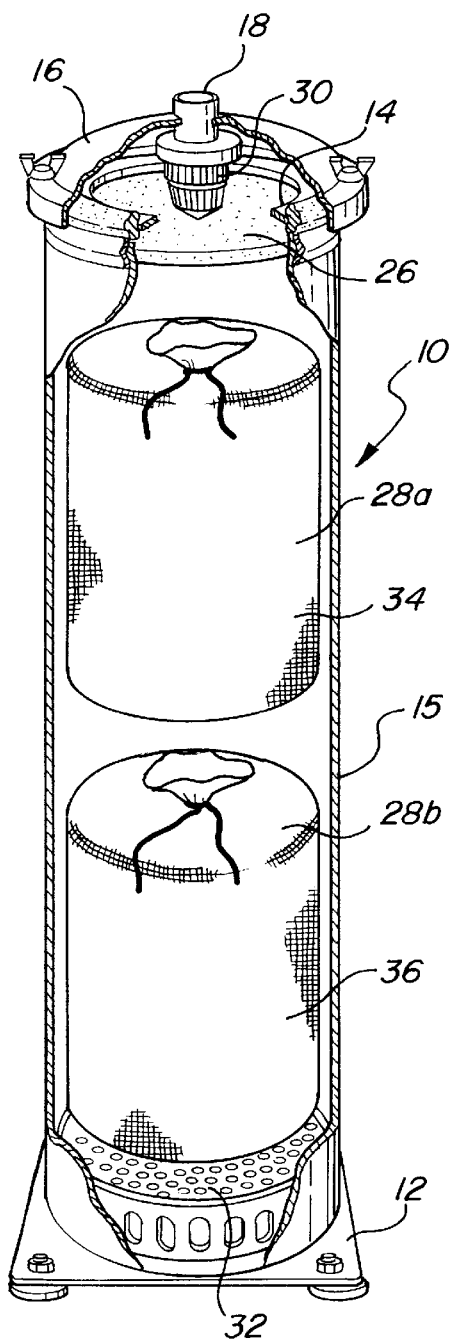

LIQUID DEIONIZING TWIN BED APPARATUS

BACKGROUND OF THE INVENTION

1. Field of the Invention

The present invention relates, generally, to a liquid deionizing system and, more specifically, to liquid deionizing twin bed apparatus of the type used in connection with a pressure vessel having an inlet for receiving untreated ionized liquid and an outlet through which the treated deionized liquid exits the vessel.

2. Description of the Related Art

Deionizing systems remove impurities from liquid such as water. Today, much of the municipal and well water used by residential and commercial consumers is termed "hard" because it contains certain mineral salts and metals. Certain consumers, for example soft drink and alcohol manufacturers, must purify the water used in their products. In addition, the demand for purified water among individual consumers is also growing. Furthermore, hard water creates problems beyond human consumption. The dissolved metals give the water a significant level of conductivity. Certain industrial applications, for example, coolants for electrical discharge machinery, require water with extremely low levels of conductivity. Water deionizing systems remove these impurities.

These systems typically include a pressure vessel that houses polystyrene ion exchange materials in the form of small beads. Exchange materials are generally of two types: anionic and cationic. Anionic exchange materials are given a positive charge and cationic exchange materials are given a negative charge. When a liquid such as ionized water is run through the pressure vessel, the beads react with the water and bond with the impurities. In turn, the exchange materials release hydrogen and oxygen resulting in extremely pure water. After a certain amount of time, however, the exchange materials become "full" or "spent" and lose the ability to remove impurities. At this point, the anionic and cationic exchange materials must go through a process called regeneration.

During regeneration, one type of exchange material is subjected to an acid, and the other is subjected to a caustic. This strips the beads of the respective exchange materials of "bad" chemicals and reapplies hydrogen and oxygen ions. This process normally takes place at regularly scheduled intervals. The amount of time between regeneration cycles depends on the purpose for which the deionizing system is employed. For example, in heavy industrial use in an EDM environment, the exchange materials may require regeneration every one to two weeks. Other water purifying environments may require regeneration once a month or at longer intervals.

Anionic and cationic exchange materials require different regenerating agents. Where the treatment of liquids requires the use of two or more exchange materials which must be regenerated with different regenerating agents, the different exchange materials are sometimes placed in separate pressure vessels. These vessels are then connected in fluid communication with each other. Raw water is delivered to the tank housing anion exchange materials. The water passes through the tank and is then delivered to the second tank housing cation exchange materials. Once the water has passed through the second tank, it is purified and ready for use. Keeping exchange materials in separate, homogeneous groups is known in the art as a "twin bed."

Unfortunately, connecting several pressure vessels in series can require a great deal of hardware, plumbing and technical effort. When the exchange materials are spent and require regeneration, the vessels must be disconnected from the system, removed and taken to a regeneration facility. It is relatively costly to remove, transport, and reinstall several pressure vessels every time regeneration is needed. Thus, there was a demand in the related art to provide a single pressure vessel which housed both anionic and cationic exchange materials which would thereby reduce the labor and overall cost of exchanging pressure vessels.

The use of different exchange materials requiring different regeneration agents mixed together within a single pressure vessel is known in the art as a "mixed bed." Pressure vessels employing mixed beds eliminated the need for, and expenses associated with, multiple vessels. However, it is still costly to remove, transport, and reinstall even one pressure vessel when regeneration is needed. Therefore, it became known to house exchange materials within the pressure vessel in a liquid permeable container. When regeneration is necessary, the container is removed from the pressure vessel and taken to the regeneration facility. This practice again reduced labor efforts associated with regeneration, saving time and money. At the same time, it should be noted that mixed bed deionizing systems have 20–30% shorter useful lives when compared with twin bed systems.

Although mixed beds and removable liquid permeable containers were considered an improvement in the related art, there is still a major cost associated with regeneration. When mixed beds are employed, the anionic and cationic exchange materials must be manually separated into homogeneous groups before they can be regenerated. The labor associated with the separation of exchange materials now represents the single largest expense in the regeneration of mixed beds.

In an effort to overcome the cost disadvantage associated with the regeneration of mixed beds, regeneration of the exchange materials within the pressure vessel itself has been proposed. For example, U.S. Pat. No. 4,400,278 issued to Martinola discloses a countercurrent water treatment tank. The Martinola '278 treatment tank operates using two or more exchange materials which are regenerated with different agents within the tank itself. More specifically, Martinola discloses that the loading of the different absorbents (exchange materials) is effected in a stream of liquid flowing upward and regeneration of the different spent absorbents using different regeneration agents is effected in a stream of liquid flowing downward. The Martinola treatment tank is subdivided into a number of chambers corresponding to the number of different absorbents used. Each of the chambers are equipped with a liquid drainage system which is located below the device which is permeable to liquid and forms the upper boundary of the chamber and which is embedded in a layer of inert material. The spent regenerating agent and washing water are removed via the liquid drainage system of the chamber below simultaneously with a stream of water which flows in counter-current to the stream of spent regenerating agent and washing water and which is being passed from the bottom upwards through this very chamber below. However, the Martinola '278 water treatment tank suffers from the disadvantage that it is relatively complex, requiring sophisticated internal plumbing and controls and is therefore relatively expensive.

Thus, there remains a need in the art to house different exchange materials requiring different regenerating agents in a single pressure vessel with a relatively simple structure while at the same time keeping those different exchange materials in twin beds (homogeneous groups) in order to minimize labor costs associated with regeneration.

SUMMARY OF THE INVENTION

The present invention overcomes the disadvantages in the related art in a liquid deionizing twin bed apparatus of the type used in conjunction with a pressure vessel having an inlet for receiving untreated ionized liquid and an outlet through which treated deionized liquid exits the vessel. More specifically, the present invention includes at least one liquid permeable container having an anionic exchanger bed containing materials adapted to absorb one type of charged particle from the fluid, and having a cationic exchanger bed containing materials adapted to absorb oppositely charged particles from the liquid flowing therethrough. The anionic and cationic beds are separate from one another and positioned in series in the liquid permeable container relative to fluid flow therethrough and the liquid permeable container is adapted to be removably housed within the vessel for removing spent anionic and cationic materials and replacing spent anionic and cationic materials by inserting a new liquid permeable container having unspent anionic and cationic materials into the vessel.

A further embodiment of the present invention includes at least two liquid permeable containers, wherein at least one of the liquid permeable containers defines an anionic exchanger bed containing materials adapted to absorb one type of charged particles from the fluid and the other of the two liquid permeable containers defines a cationic exchanger bed containing materials adapted to absorb oppositely charged particles from the liquid flowing therethrough. The anionic and cationic beds are separate from one another and positioned in series in the vessel relative to fluid flow therethrough and the liquid permeable containers are adapted to be removably housed within the vessel for removing spent anionic and cationic materials and replacing spent anionic and cationic materials by inserting new liquid permeable containers having unspent anionic and cationic materials in the vessel.

One advantage of the present invention is that different exchange materials requiring different regenerating agents can be housed in a single vessel with a relatively simple structure.

Another advantage of the present invention is that the different exchange materials may be easily removed from the filtering vessel.

A further advantage of the present invention is that the different exchange materials are at all times separated into homogeneous groups which results in a significant reduction in the cost of regeneration of the exchange materials.

Accordingly, the present invention overcomes the disadvantages in the related art in a liquid deionizing twin bed apparatus which is easily installed and removed from a pressure vessel, is efficient, effective in operation and greatly reduces the labor costs of regeneration when compared with systems employing mixed beds.

Other features and advantages of the present invention will be readily appreciated as the same becomes better understood after reading the subsequent description when considered in connection with the accompanying drawings.

BRIEF DESCRIPTION OF THE DRAWINGS

FIG. 5 is a perspective view of the pressure vessel with a partial cross-section illustrating another embodiment of the liquid deionizing twin bed apparatus of the present invention; and FIG. 6 is a perspective view of the pressure vessel with a partial cross-section illustrating another embodiment of the liquid deionizing twin bed apparatus of the present invention.

DETAILED DESCRIPTION OF THE PREFERRED EMBODIMENT(S)

Figure 1:
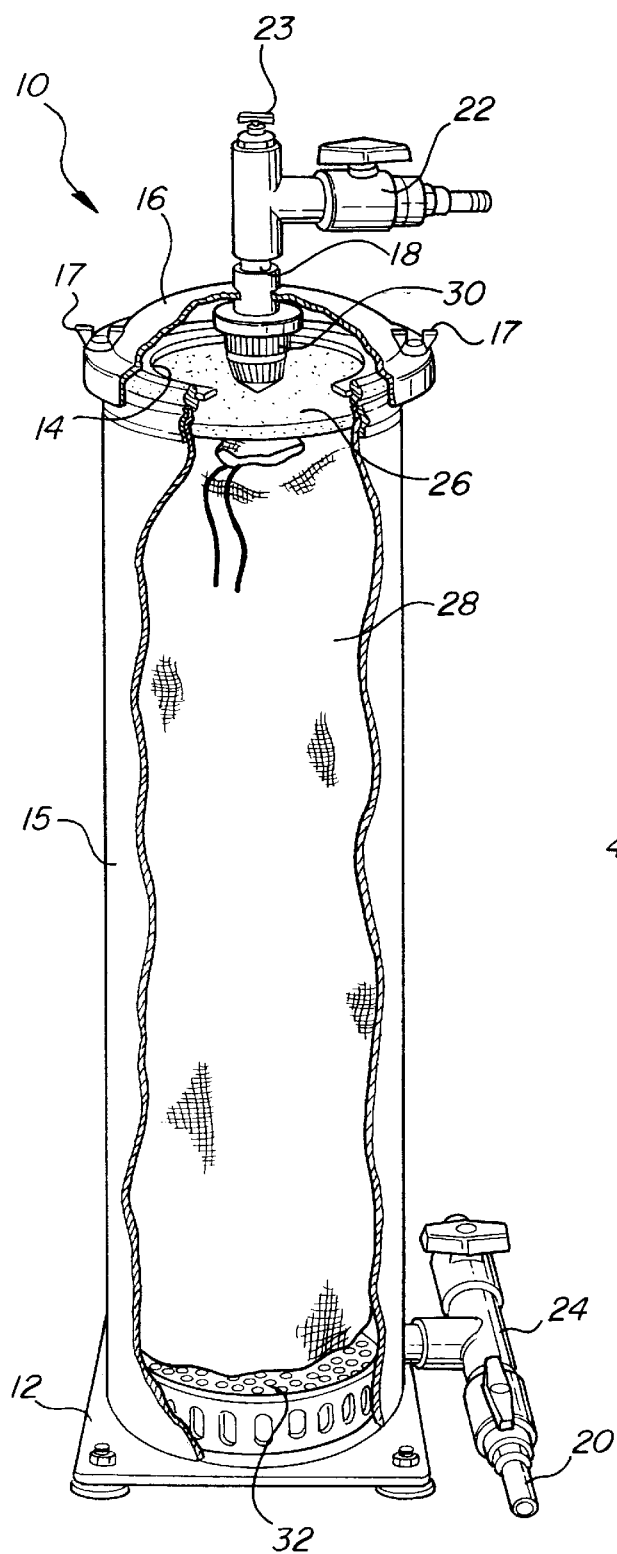
FIG. 1 is a perspective view of the pressure vessel with a partial cross-section illustrating the liquid deionizing twin bed apparatus of the present invention.

The liquid deionizing twin bed apparatus of the present invention is used in conjunction with a pressure vessel generally indicated at 10 throughout the Figures. Referring to FIG. 1, the pressure vessel 10 generally includes of a base 12 and an upper open end 14, with a cylindrical sidewall 15 extending between. A lid 16 removably closes the open end 14 using a fastening device such as wing nuts 17. However, it will be appreciated that any other suitable fastening mechanism may be employed. The pressure vessel 10 may be made of steel or any other suitable material and, generally may take any shape other than cylindrical which may be convenient to a particular application.

The pressure vessel 10 further includes an inlet 18 located at the top of the vessel 10 for receiving untreated ionized liquid and an outlet 20 located at the bottom of the vessel 10 through which treated deionized liquid exits. The inlet 18 has a valve 22 for controlling fluid communication between the source of the ionized fluid (not shown) and the pressure vessel 10. The inlet 18 also includes an air vent 23 which may be opened to allow air to enter the pressure vessel 10. In addition, the outlet 20 has a valve 24 for controlling fluid flow from the pressure vessel 10.

A pre-filter 26 is located in the vessel 10 between the inlet 18 and a liquid permeable container 28. A distribution header 30, which is in fluid communication with the inlet 18, is disposed between the inlet 18 and the pre-filter 26. The distribution header 30 distributes untreated ionized water over the pre-filter 26. The vessel also includes a grid 32 which is located between the liquid permeable container 28 and the outlet 20 near the bottom of the vessel 10.

Figure 2:
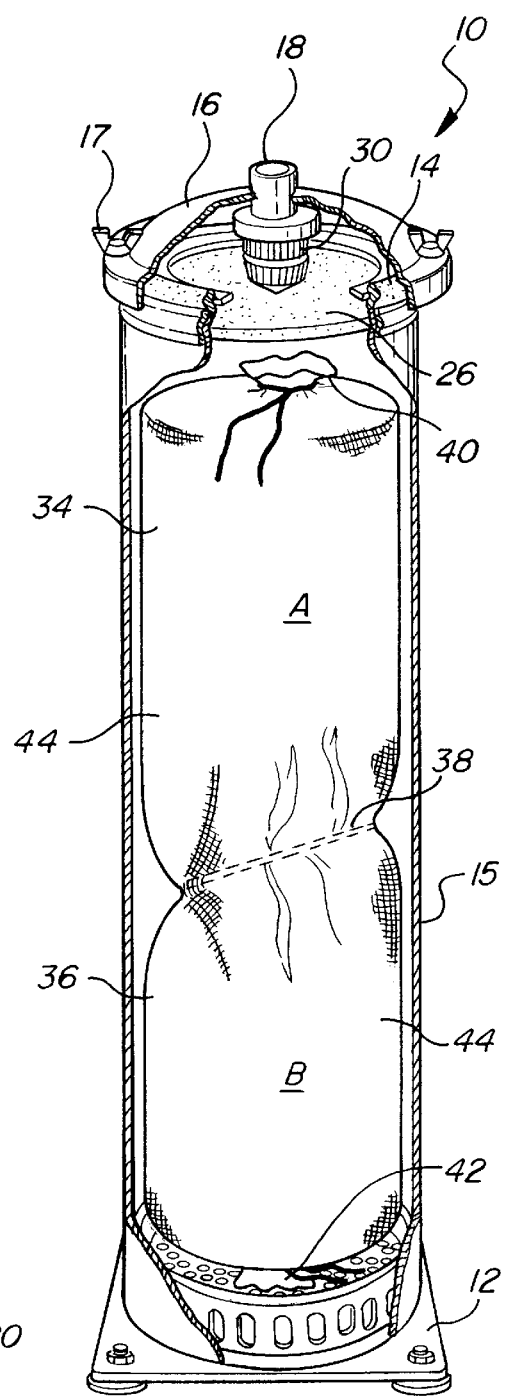
FIG. 2 is a perspective view of the pressure vessel with a partial cross-section illustrating one embodiment of the liquid deionizing twin bed apparatus of the present invention.

Referring to FIG. 2 where one embodiment of the present invention is shown, the liquid permeable container 28 has an anionic exchanger bed 34 containing exchange materials adapted to absorb a certain type of charged particle from the fluid. The container 28 also has a cationic exchanger bed 36 containing exchange materials adapted to absorb oppositely charged particles from the liquid flowing therethrough. The exchange materials may be polystyrene ion exchange materials or resins or any other suitable material. The anionic and cationic beds 34 and 36 are separate from one another and positioned in series in the container 28 relative to the fluid flow. One important feature of the present invention is that the container 28 housing both the anionic and cationic exchange beds 34, 36 is adapted to be removably housed within the vessel 10 of FIG. 1. This facilitates the removing of spent anionic 34 and cationic 36 exchange materials and also replacing the same.

In one preferred embodiment, the container 28 may be a liquid permeable bag made of nuclear resin. The bag 28 has a closeable open end 40, a closed end 42, and sidewalls 44 extending between. The bag is divided into at least two sub-containers A and B while allowing flow between the two sub-containers A and B. One of the two subcontainers A defines an anionic exchanger bed 34 and the other of the sub-containers B defines a cationic exchanger bed 36. There are many ways to divide the container 28 into sub-containers. One way is to make a closure 38 between the anionic 34 and cationic 36 exchanger beds. This closure 38 keeps the anionic and cationic exchange materials separate from each other while allowing fluid flow between the two beds 34, 36. The closure 38 can be accomplished by clamping, cinching, or sewing the bag or by using another suitable method.

Figure 3:
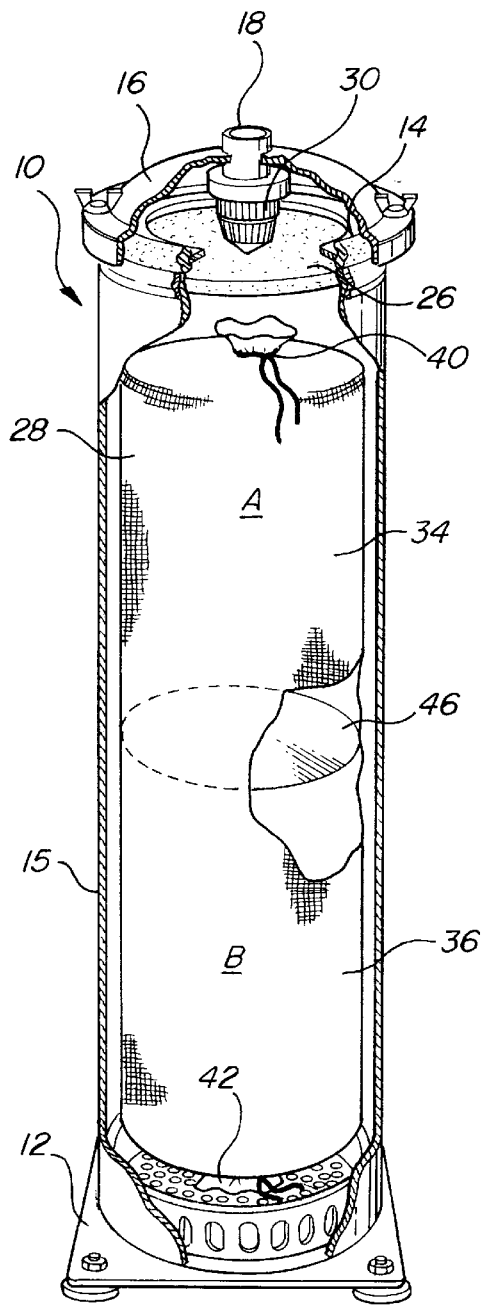
FIG. 3 is a perspective view of the pressure vessel with a partial cross-section illustrating another embodiment of the liquid deionizing twin bed apparatus of the present invention.

FIG. 3 shows another embodiment including an alternative to making a closure to divide the container 28 into sub-containers A and B. A liquid permeable partition 46 is positioned between the anionic 34 and cationic 36 exchanger beds and divides the container 28. The liquid permeable partition 46 may be a screen, grate, or any other suitable material.

Figure 4:
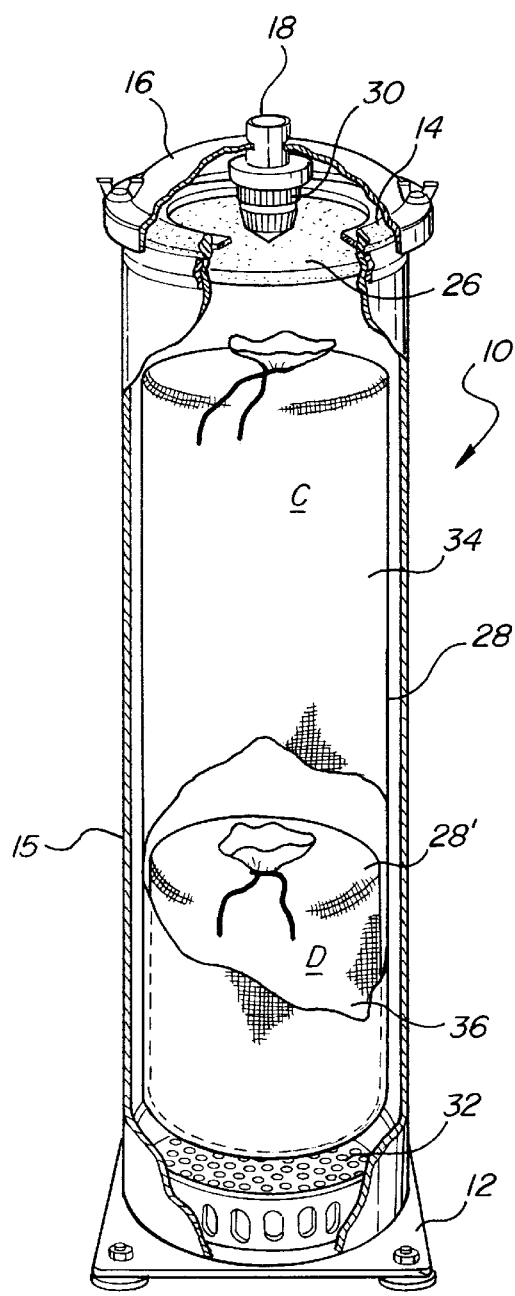
FIG. 4 is a perspective view of the pressure vessel with a partial cross-section illustrating another embodiment of the liquid deionizing twin bed apparatus of the present invention.

Once again, FIG. 4 shows another embodiment including an alternative to dividing the container 28 into sub-containers. The container 28 may house at least two sub-containers C and D. One of the two sub-containers C defines an anionic exchanger bed 34 and the other of the two sub-containers D defines a cationic exchanger bed 36. The primary container 28 provides liquid flow between the two sub-containers C and D. This may be accomplished, for example, when the primary liquid permeable container 28 houses one secondary liquid permeable container 28' as shown in FIG. 4. This may also be accomplished as shown in FIG. 5 when the primary liquid permeable container 28 houses two or more secondary liquid permeable containers 28' and 28". The primary container 28 is adapted to be removably housed within the vessel of FIG. 1. The secondary containers 28', 28" are shown spaced relative to one another for illustrative purposes.

FIG. 6 shows yet another embodiment of the present invention. At least two liquid permeable containers 28a and 28b are housed in the pressure vessel 10 of FIG. 1. One of the liquid permeable containers 28a defines an anionic exchanger bed 34. The other liquid permeable container 28b defines a cationic exchanger bed 36. The anionic 34 and cationic 36 beds are separate from one another and positioned in series in the vessel 10 relative to the fluid flow, and the first container 28a provides liquid flow between the two containers 28a and 28b. Both containers 28a and 28b are adapted to be removably housed within the vessel 10 of FIG. 1.

In this way, each of the embodiments illustrated in FIGS. 1 through 6 provides a liquid deionizing twin bed apparatus wherein different exchange materials requiring different regenerating agents are separately housed in a single pressure vessel with a relatively simple structure resulting in lower cost and increased efficiencies. More specifically, the twin bed apparatus of the present invention are easily removable from the pressure vessel and exchanged for new twin bed apparatuses. However, and unlike anything in the related art, the anionic and cationic exchange materials are at all times kept separate in their homogeneous groups. Accordingly, the higher labor costs associated with the regeneration of mixed beds are avoided entirely and significantly reduce the overall costs of operating a deionizing system of the present invention. Those of ordinary skill in the art will no doubt be able to envision bed configurations which differ slightly from those described above and shown in the Figures without departing from the scope and spirit of the present invention.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

I claim:

1. A liquid deionizing twin bed apparatus for use in conjunction with pressure vessel having an inlet for receiving untreated ionized liquid and an outlet through which the treated deionized liquid exits the vessel, said apparatus comprising:

at least one liquid permeable container, said container having an anionic exchanger bed containing anionic materials adapted to absorb one type of charged particle from the fluid and requiring one type of regenerating agent to strip charged particles from said anionic materials, said container also having a cationic exchanger bed containing cationic materials adapted to absorb oppositely charged particles from the liquid flowing therethrough and requiring a different type of regenerating agent to strip charged particles from said cationic materials, said anionic and cationic beds being positioned in series in said liquid permeable container relative to fluid flow therethrough and said at least one liquid permeable container being adapted to be removably housed within the vessel for removing spent anionic and cationic materials and replacing spend anionic and cationic materials by inserting a new liquid permeable container having unspent anionic and cationic materials into the vessel.

2. An apparatus as set forth in claim 1 wherein said at least one liquid permeable container is divided into at least two sub-containers while providing liquid flow between said two sub-containers and with one of two said sub-containers defining an anionic exchanger bed and the other of two said sub-containers defining a cationic exchanger bed.

3. An apparatus as set forth in claim 1 wherein said at least one liquid permeable container includes a primary container and at least two sub-containers housed within said primary container, one of said at least two sub-containers defining an anionic exchanger bed and the other of two said sub-containers defining a cationic exchanger bed, said primary container providing liquid flow between said two sub-containers.

4. An apparatus as set forth in claim 1 wherein said at least one liquid permeable container includes a dividing mechanism for separating said anionic exchanger bed from said cationic exchanger bed and keeping said anionic and cationic materials separate from each other while allowing fluid flow through said liquid permeable container and between said anionic and cationic exchanger beds.

5. An apparatus as set forth in claim 4 wherein said dividing mechanism includes a liquid permeable partition positioned between said anionic and cationic exchanger bed in said at least one liquid permeable container.

6. An apparatus as set forth in claim 4 wherein said dividing mechanism is defined by a closure made in said liquid permeable container between said anionic and cationic exchanger beds, said closure keeping said anionic and cationic materials separate from each other while allowing fluid flow through said liquid permeable container and between said anionic and cationic exchanger beds.

7. An apparatus as set forth in claim 6 wherein said liquid permeable container includes a bag having at least one closable open end, at least one closed end, and side walls extending therebetween, said closure formed by clamping said side walls together between said anionic and cationic exchanger beds so as to keep said anionic and cationic materials separate from each other while allowing fluid flow through said liquid permeable container and between said anionic and cationic exchanger beds.

8. An apparatus as set forth in claim 6 wherein said liquid permeable container includes a bag having at least one closable open end, at least one closed end, and side walls extending therebetween, said closure formed by cinching said side walls together between said anionic and cationic exchanger beds so as to keep said anionic and cationic materials separate from each other while allowing fluid flow through said liquid permeable container and between said anionic and cationic exchanger beds.

9. An apparatus as set forth in claim 6 wherein said liquid permeable container includes a bag having at least one closable open end, at least one closed end, and side walls extending therebetween, said closure formed by stitching said side walls together between said anionic and cationic exchanger beds so as to keep said anionic and cationic materials separate from each other while allowing fluid flow through said liquid permeable container and between said anionic and cationic exchanger beds.

10. A liquid deionizing twin bed apparatus for use in conjunction with a pressure vessel having an inlet for receiving untreated ionized liquid and an outlet through which the treated deionized liquid exits the vessel, said apparatus comprising:

at least two liquid permeable containers, wherein at least one of said liquid permeable containers defines an anionic exchanger bed containing anionic materials adapted to absorb one type of charged particle from the fluid and requiring one type of regenerating agent to strip charged particles from said anionic materials, and the other of said two liquid permeable containers defines a cationic exchanger bed containing cationic materials adapted to absorb oppositely charged particles from the liquid flowing therethrough and requiring a different type of regenerating agent to strip charged particles from said cationic materials, said anionic and cationic beds being positioned in series in the vessel relative to fluid flow therethrough and said at least two liquid permeable containers being adapted to be removingly housed within the vessel for removing spent anionic and cationic materials and replacing spent anionic and cationic materials by inserting new liquid permeable containers having unspent anionic and cationic materials into the vessel.

11. A liquid deionizing system comprising:

a pressure vessel having an inlet for receiving untreated ionized liquid and an outlet through which the treated deionized liquid exits said vessel; and at least one liquid permeable container, said container having an anionic exchanger bed containing anionic materials adapted to absorb one type of charged particle from the fluid and requiring one type of regenerating agent to strip charged particles from said anionic materials, said container also having a cationic exchanger bed containing cationic materials adapted to absorb oppositely charged particles from the liquid flowing therethrough and requiring a different type of regenerating agent to strip charged particles from said cationic materials, said anionic and cationic beds being positioned in series in said liquid permeable container relative to fluid flow therethrough and said at least one liquid permeable container being adapted to be removably housed within the vessel for removing spent anionic and cationic materials and replacing spent anionic and cationic materials by inserting a new liquid permeable container having unspent anionic and cationic materials into the vessel.

12. An apparatus as set forth in claim 11 wherein said at least one liquid permeable container is divided into at least two sub-containers while providing liquid flow between said two subcontainers and with one of two said subcontainers defining an anionic exchanger bed and the other of two said subcontainers defining a cationic exchanger bed.

13. An apparatus as set forth in claim 11 wherein said at least one liquid permeable container includes a primary container and at least two subcontainers housed within said primary container, one of said at least two subcontainers defining an anionic exchanger bed and the other of two said subcontainers defining a cationic exchanger bed, said primary container providing liquid flow between said two subcontainers.

14. An apparatus as set forth in claim 11 wherein said at least one liquid permeable container includes a dividing mechanism for separating said anionic exchanger bed from said cationic exchanger bed and keeping said anionic and cationic materials separate from each other while allowing fluid flow through said liquid permeable container and between said anionic and cationic exchanger beds.

15. An apparatus as set forth in claim 14 wherein said dividing mechanism includes a liquid permeable partition positioned between said anionic and cationic exchanger bed in said at least one liquid permeable container.

16. An apparatus as set forth in claim 14 wherein said dividing mechanism is defined by a closure made in said liquid permeable container between said anionic and cationic exchanger beds, said closure keeping said anionic and cationic materials separate from each other while allowing fluid flow through said liquid permeable container and between said anionic and cationic exchanger beds.

17. An apparatus as set forth in claim 16 wherein said liquid permeable container includes a bag having at least one closable open end, at least one closed end, and side walls extending therebetween, said closure formed by clamping said side walls together between said anionic and cationic exchanger beds so as to keep said anionic and cationic materials separate from each other while allowing fluid flow through said liquid permeable container and between said anionic and cationic exchanger beds.

18. An apparatus as set forth in claim 16 wherein said liquid permeable container includes a bag having at least one closable open end, at least one closed end, and side walls extending therebetween, said closure formed by cinching said side walls together between said anionic and cationic exchanger beds so as to keep said anionic and cationic materials separate from each other while allowing fluid flow through said liquid permeable container and between said anionic and cationic exchanger beds.

19. An apparatus as set forth in claim 16 wherein said liquid permeable container includes a bag having at least one closable open end, at least one closed end, and side walls extending therebetween, said closure formed by stitching said side walls together between said anionic and cationic exchanger beds so as to keep said anionic and cationic materials separate from each other while allowing fluid flow through said liquid permeable container and between said anionic and cationic exchanger beds.

* * * * *